Dec. 9, 1924.
R. R. WEAVER
TANK CAR
Filed July 11, 1923   8 Sheets-Sheet 1
1,518,471
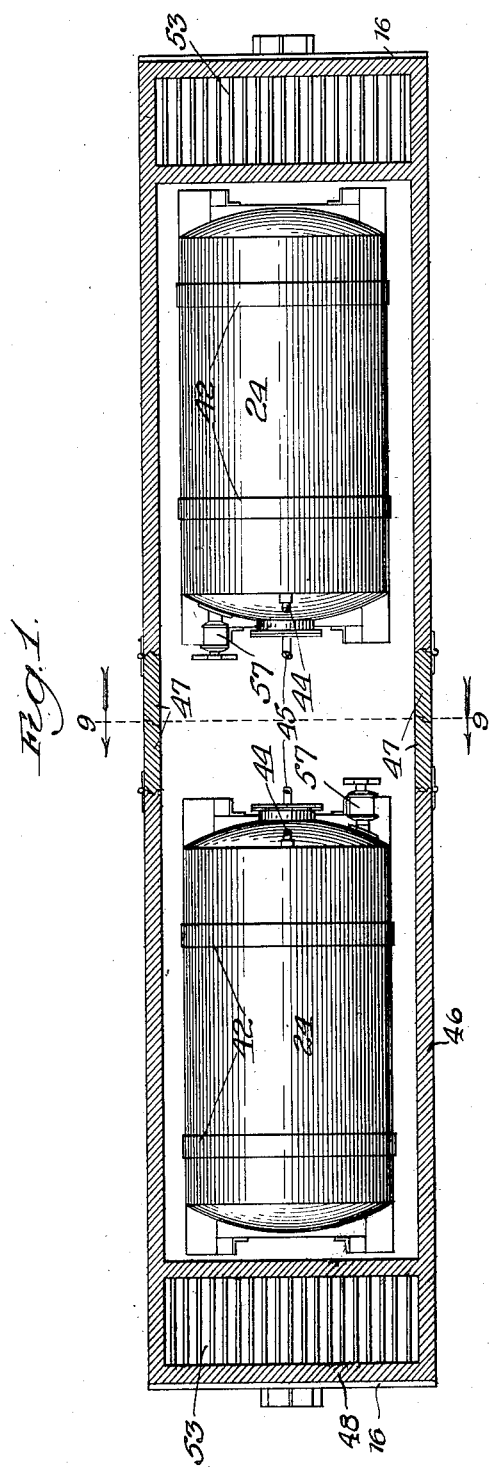
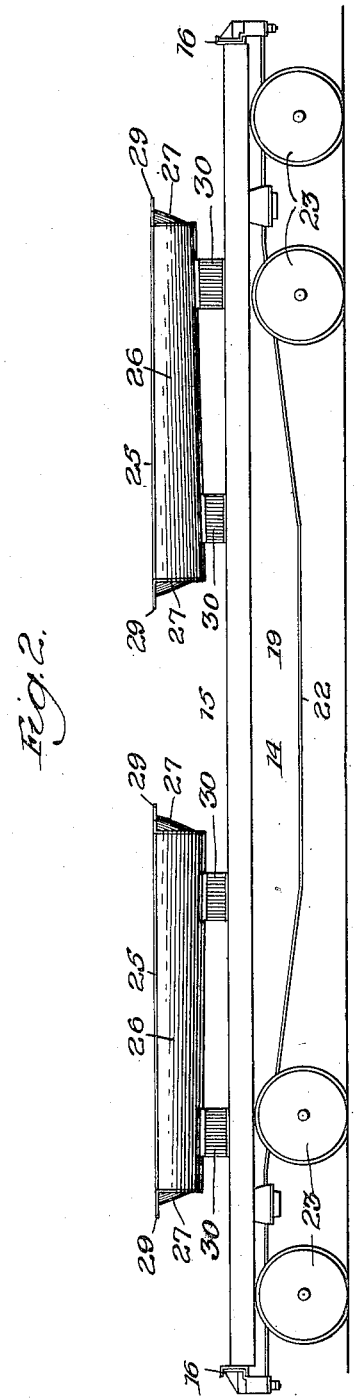
Inventor,
Robert R. Weaver, Dec. 9, 1924. 1,518,471
R. R. WEAVER
TANK CAR
Filed July 11, 1923 8 Sheets-Sheet 2
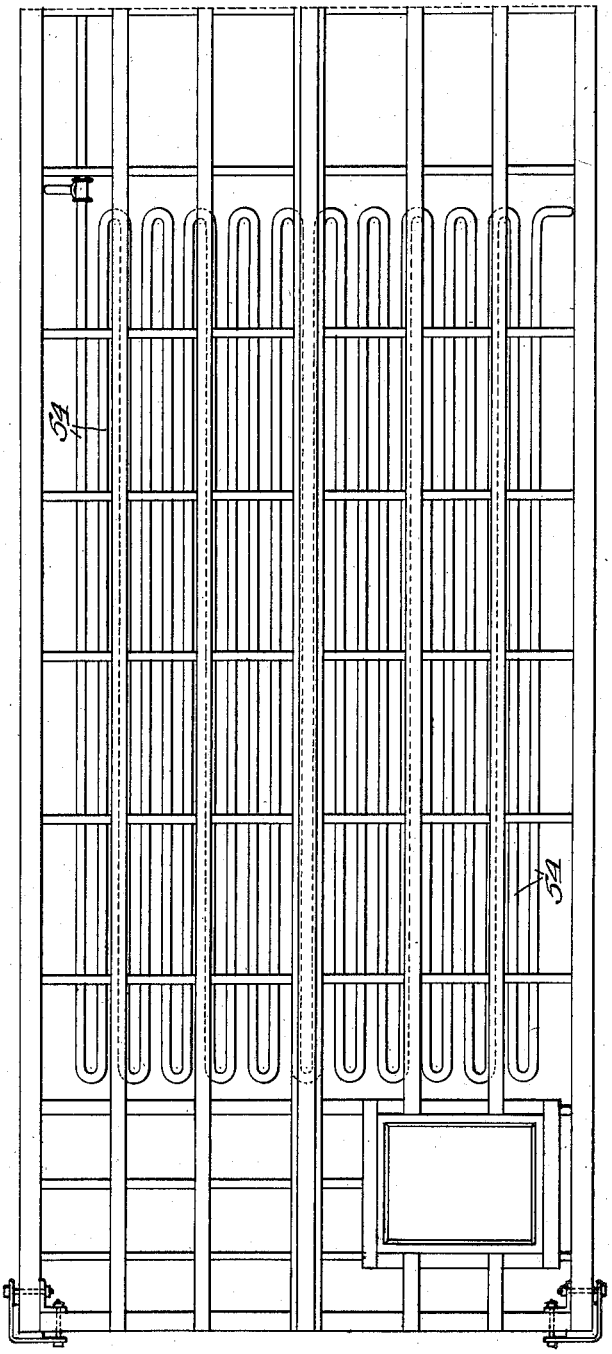

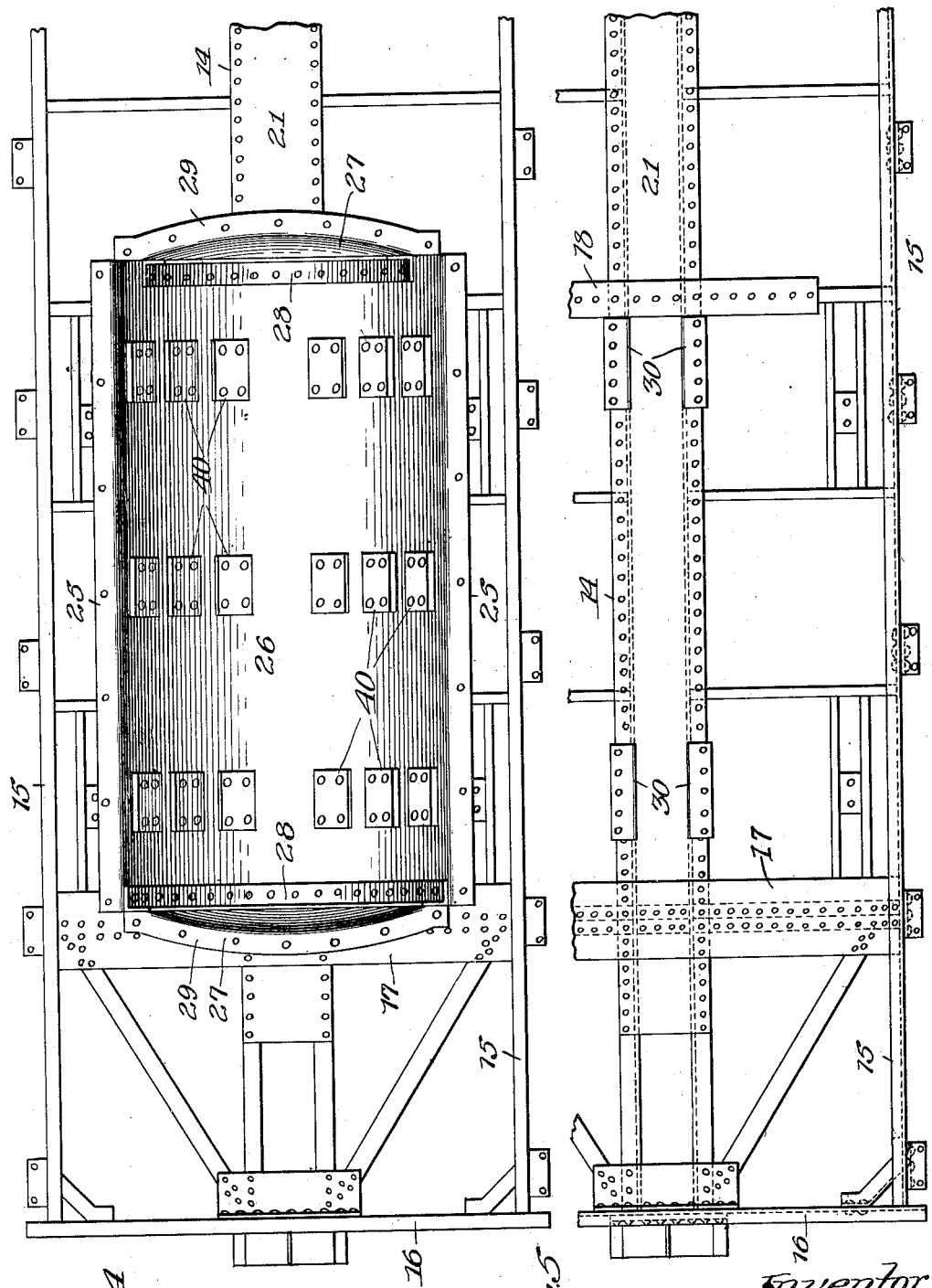

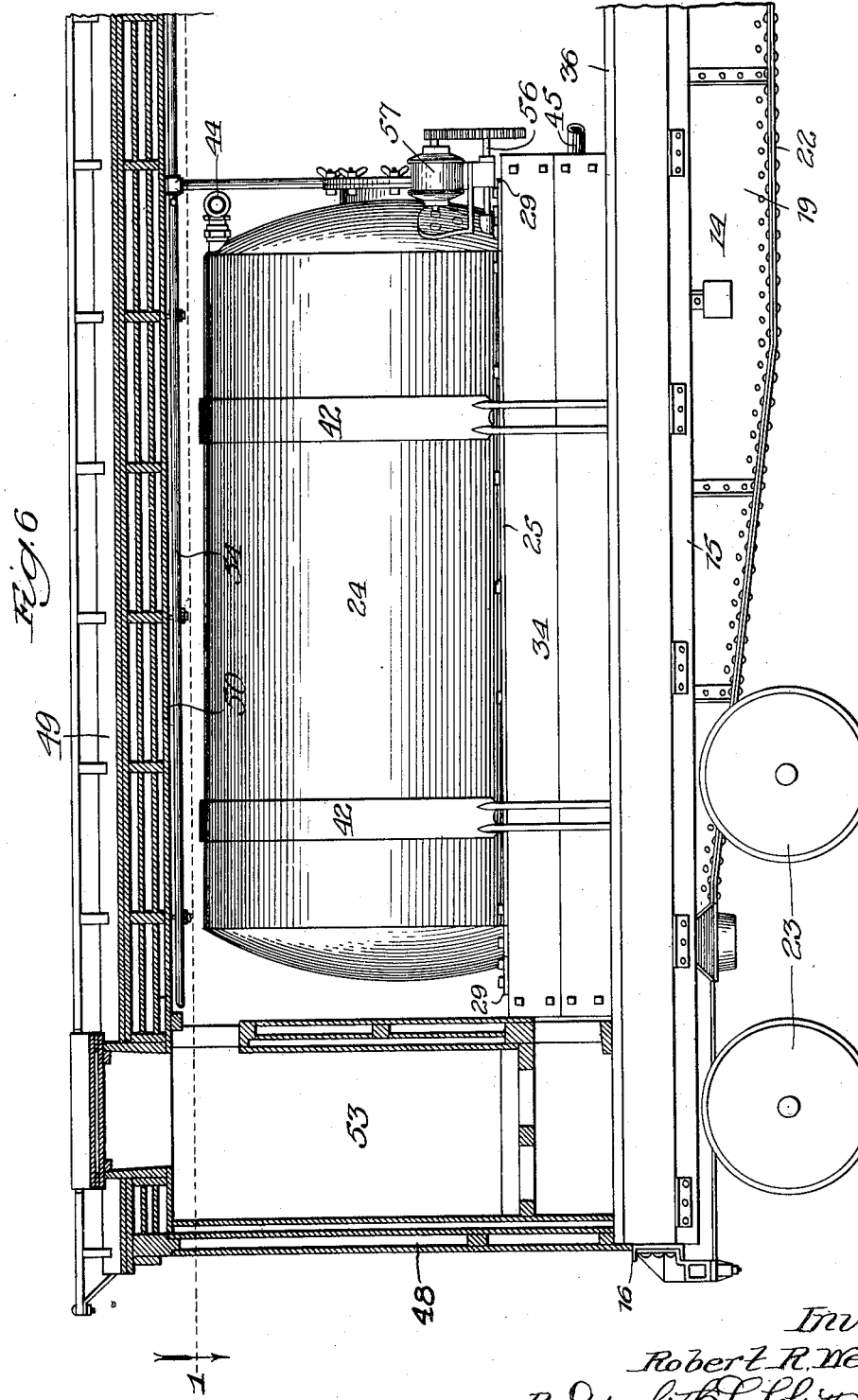

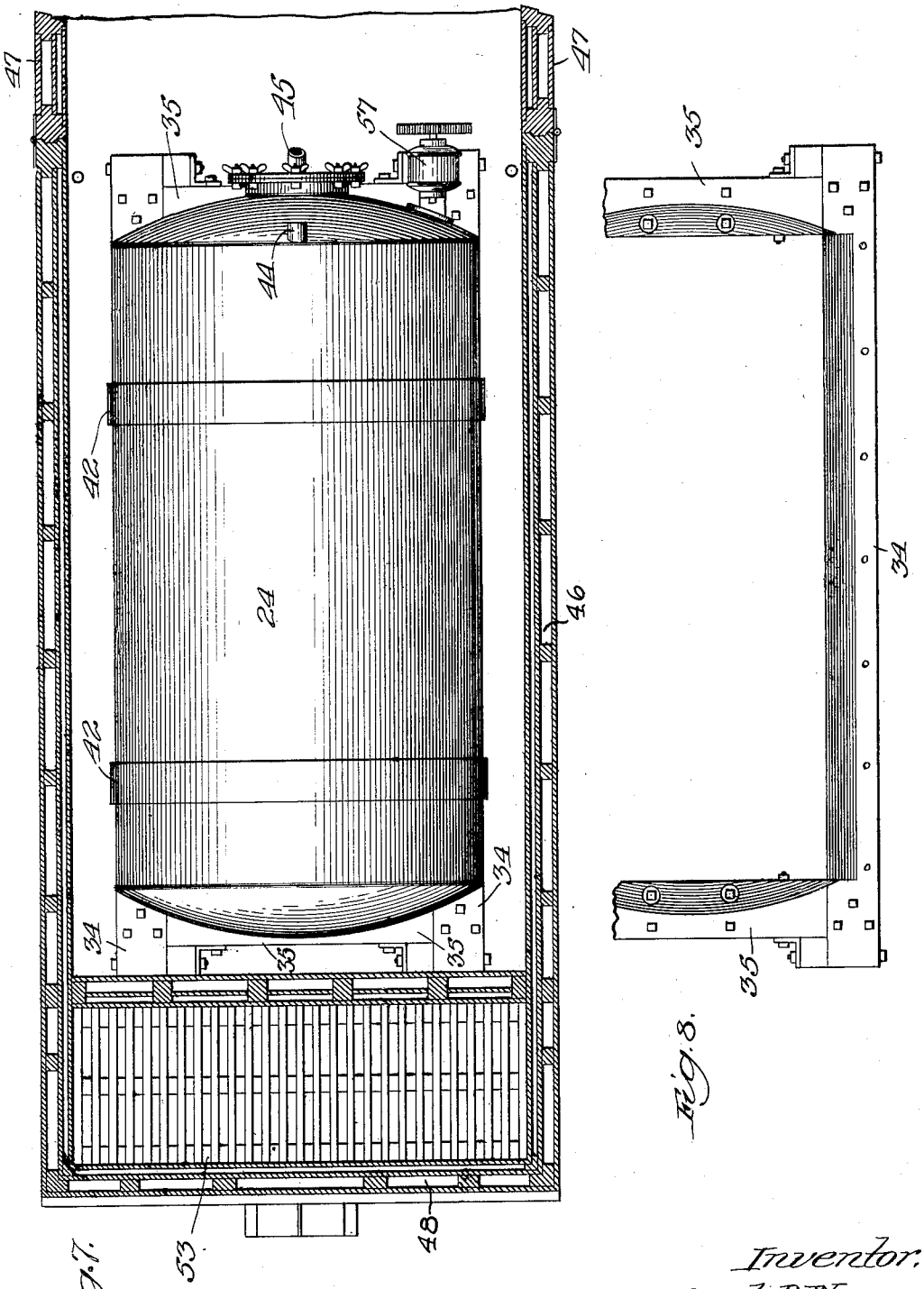

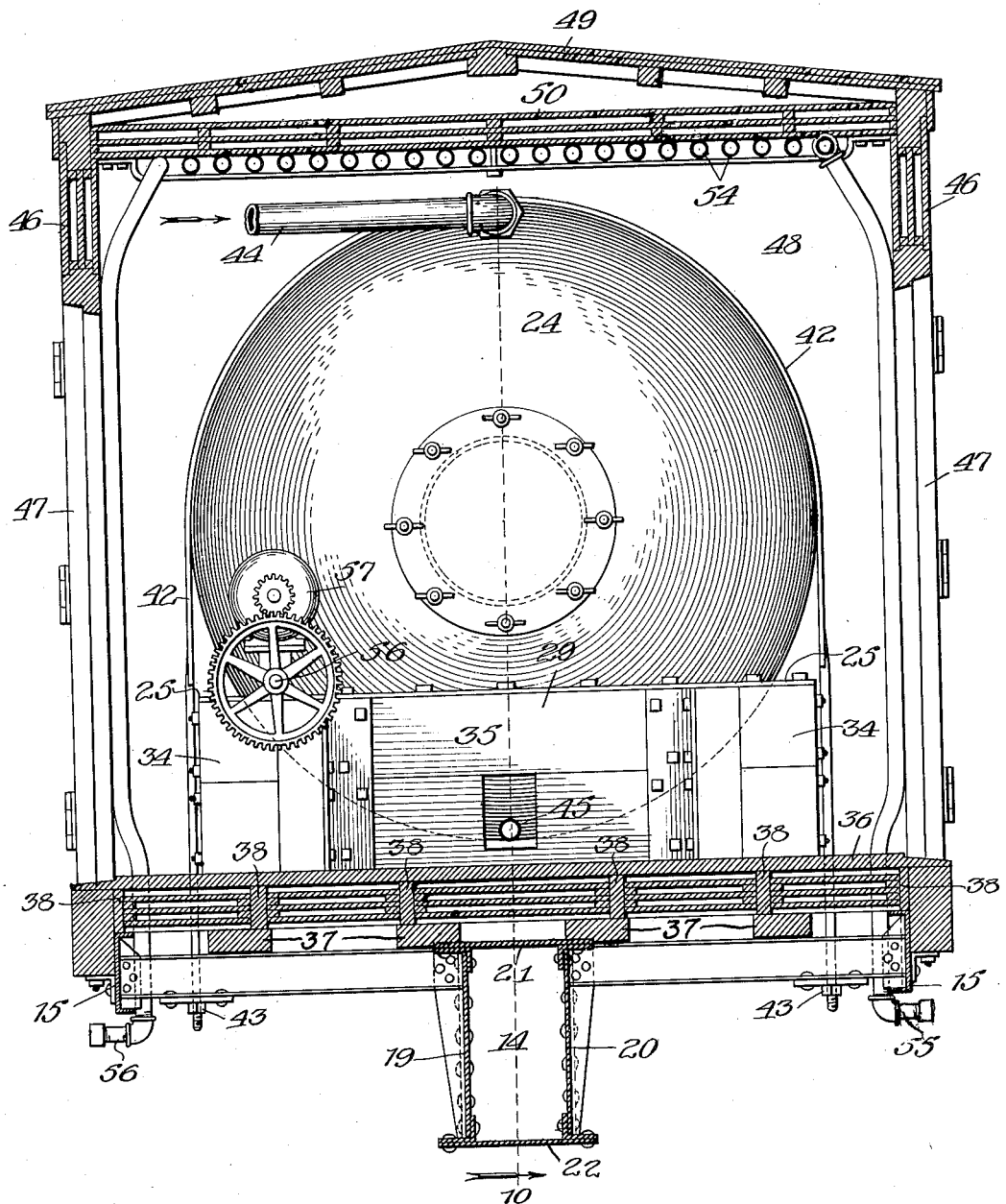

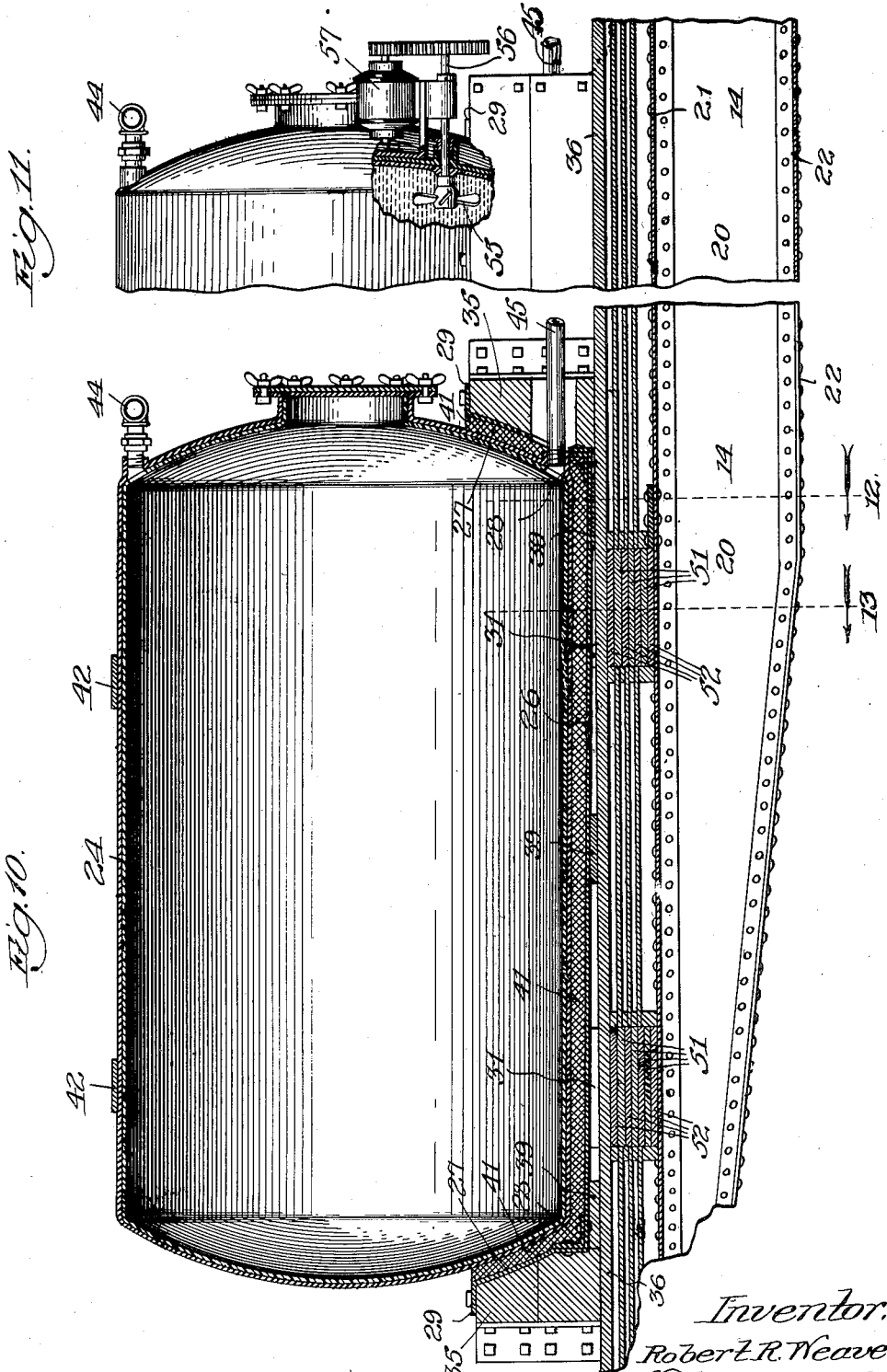

Dec. 9, 1924.

R. R. WEAVER

TANK CAR

Filed July 11, 1923    8 Sheets-Sheet 8

1,518,471

Inventor:
Robert R. Weaver,
By Dyrenforth, Lee, Chritton & Wiles,
Att'ys

Patented Dec. 9, 1924.

1,518,471

UNITED STATES PATENT OFFICE.

ROBERT R. WEAVER, OF CHICAGO, ILLINOIS, ASSIGNOR TO GENERAL AMERICAN TANK CAR CORPORATION, OF CHICAGO, ILLINOIS, A CORPORATION OF WEST VIRGINIA.

TANK CAR.

Application filed July 11, 1923. Serial No. 650,886.

*To all whom it may concern:*

Be it known that I, ROBERT R. WEAVER, a citizen of the United States, residing at Chicago, in the county of Cook and State of Illinois, have invented a new and useful Improvement in Tank Cars, of which the following is a specification.

My invention relates, more particularly, to tank cars, the tanks of which comprise a lining of glass or enamel, and are provided, more particularly, for the transporting of perishable liquids, such, as for example, milk.

The matter of anchoring in place on the car, tanks of the character above referred to, to the end that they shall be held against movement on the body of the car, lengthwise of the latter, has presented a serious problem due to the fact that, in order to produce the desirable lining throughout the interior of the tank, it is not possible to provide the tank with lugs, or other parts to present a point for attachment thereto of anchoring means carried by the body of the car and furthermore a fastening means to be practical must be such as will not in any way affect or break the lining of the tanks.

In this connection, it is one of my objects, to provide a novel, simple, and satisfactorily functioning construction of anchorage means for the tank, whereby a tank having the desired glass or enamel lining, may be securely anchored to the body of the car against lengthwise movement of the latter.

A further object of my invention is to provide a novel method, and apparatus, for refrigerating, and conveying in refrigerated condition, perishable liquids, and more especially milk, whereby the necessity for transporting the milk in separate cans, may be obviated; and other objects as will be manifest from the following description.

Referring to the accompanying drawings:—

Figure 12:
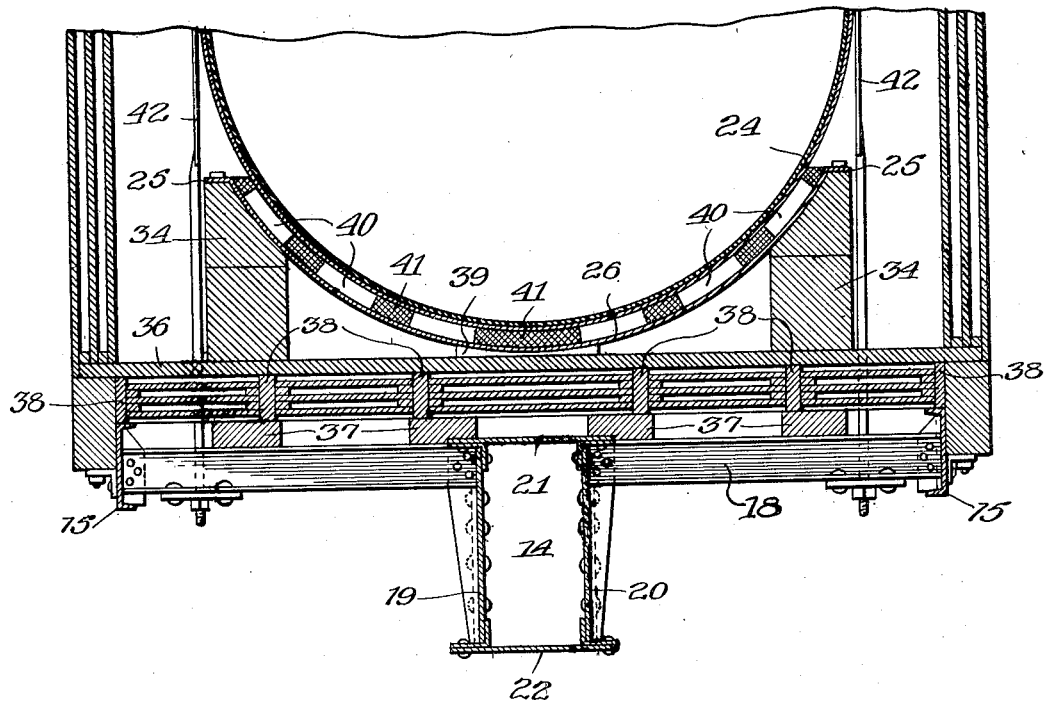
Figure 13:
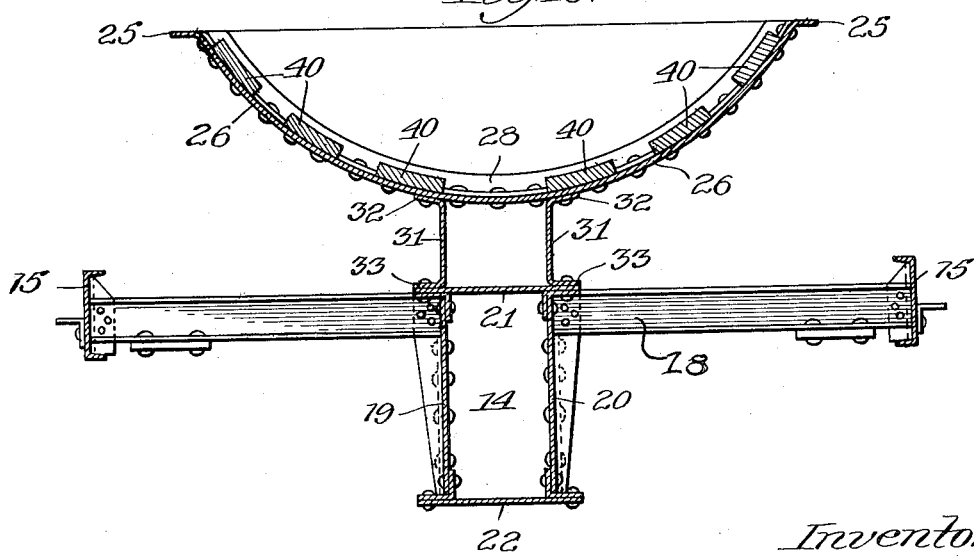

Figure 1 is a plan sectional view of a refrigerated, tank, car, embodying my improvements, the section being taken at the line 1 on Fig. 6 and viewed in the direction of the arrow. Figure 2 is a view in side elevation of the car of Fig. 1 with certain parts omitted. Figure 3 is a plan view of one end of the car of Fig. 1, with the roofboards and ceiling removed. Figure 4 is a plan view of one end of the frame of the car showing the cradle, for one of the tanks, in position on the frame. Figure 5 is a view like Fig. 4 and of the structure therein shown, but with certain parts broken away and the cradle removed. Figure 6 is a view in side elevation of the end of the car shown in Figs. 4 and 5, with the housing, superstructure of the car in position on the frame, said superstructure being shown in longitudinal section. Figure 7 is a section taken at the line 1 on Fig. 6 and viewed in the direction of the arrow. Figure 8 is a broken plan view of one of the similar cradle supports. Figure 9 is an enlarged section taken at the line 9—9 on Fig. 1 and viewed in the direction of the arrows. Figure 10 is a section, on a reduced scale, taken at the line 10 on Fig. 9 and viewed in the direction of the arrow, certain of the parts being removed and others shown broken away. Figure 11 is a broken view in side elevation of one end of one of the tanks, a portion of the end wall of the latter being shown broken away and in section, the floor of the car also being shown in section. Figure 12 is a section taken at the line 12 on Fig. 10 and viewed in the direction of the arrow; and Figure 13, a section taken at the line 13 on Fig. 10 and viewed in the direction of the arrow.

The particular construction shown involves an underframe shown, more especially in Figs. 2, 4 and 5, and of the fish-belly center-sill type, the center-sill being represented at 14 and extending longitudinally of the underframe from end to end thereof, this frame, in addition to the side and end members 15 and 16 respectively, comprising cross members 17 toward opposite ends of the underframe which connect at their ends with the side members 15, and crosswise extending members 18 located intermediate the cross members 17, the particular construction of center-sill shown being of box-like form in cross section, the spaced side walls of which and the top and bottom plate portions of which are represented at 19, 20, 21 and 22. The underframe shown is supported on wheeled trucks, the wheels of which are represented at 23. The particular construction shown involves the incorporation in the car of two of the tanks of the general type above referred to, these tanks which are shown as of elongated form and circular in cross section, being located at opposite sides of the center of the car, as shown in Fig. 1.

The anchorage means for each tank, represented at 24, comprise a bed of cushioning material in which the lower portion of the tank is embedded, the material, according to the preferred arrangement entirely surrounding the lower portion of the tank and cushioning the tank against lengthwise movement on the underframe. The material employed is preferably of such character that upon positioning this bed-material and the tank relative to each other the bed material becomes set about the tank, the material being preferably a pitch-like substance of such character that it may be flowed into embedding position about the tank, and thereafter setting. The material found to be the more desirable from which the bed referred to is to be formed, is what is known in the trade as coal tar pitch having a melting point of from about 140° to 150° F. In the particular arrangement shown the anchorage means for the tanks comprise receptacle-forming cradles 25 each shown as formed of a bottom and side-wall-forming sheet 26 of curved shape in cross section with its concave portion at its upper side, and end-forming sheets 27 shown as connected with the sheet 26, by curved angle irons 28, the upper edges of the end sheets 27 being flanged, as represented at 29. The structure just described is anchored to the under frame of the car, through the medium of the anchorages represented at 30, disposed at opposite end portions of the cradles and each formed of a pair of channels 31 spaced apart and connected at their upper flanges 32 with the sheet 26 and at their lower flanges 33 with the upper plate 21 of the center-sill. The cradle structure thus provided conformingly fits against the side timbers 34 and end, head, blocks 35 which are mounted on the floor proper 36 of the car, this floor being supported above, and in spaced relation to, the under frame of the car, by means of longitudinally-extending timbers 37 and 38 superposed on the under frame, the side members 34 and the head blocks 35 being rigidly secured together to form a box-like frame. The extreme lower portions of the cradle sheets 26 are shown as slightly spaced from the upper surface of the floor 36 in which space blocks 39, forming auxiliary seats for the sheets 26, are located. The upper concave surfaces of the sheets 26 are provided with series of spacing blocks 40 adapted to form seats for the lower portions of the tanks 24 which extend partway into the cradles, as shown, and in spaced relation thereto throughout the extent of these cradles, whereby the tanks are spaced from the walls of the cradles throughout their extent except at the spacing blocks 40.

The beds of cushioning material hereinbefore referred to and into which the lower portions of the tanks 24 extend, are located in the spaces provided between the tanks and the walls of the cradles, these beds, one for each tank in the particular construction shown, being represented at 41, it being understood that the bed material extends along the under sides of the tanks and also partway up the ends of the latter, as clearly shown in the drawings.

It may be here stated that in the building of the tank car it is preferred that the cradles be built into the structure as shown, and the tanks 24 be lowered into the cradles to rest upon the blocks 40 and extend in spaced relation at their ends from the end walls of the cradles, before the material to form the beds 41 is introduced into the cradles whereupon the bed material, in heated, fluid, condition is poured into the spaces between the tanks and the cradles to completely fill these spaces and extend preferably substantially flush with the upper surfaces of the cradles.

By preference, tank-bands 42 are provided for holding the tanks against upward displacement in the cradles, these bands being shown as extending over the top portions of the tanks at opposite ends thereof and downwardly at their ends through portions of the underframe of the car, the lower threaded ends of these bands, which extend downwardly through portions of the underframe of the car, being provided with nuts 43 through the medium of which these bands may be tightened. The tanks 24 are shown as provided at their upper ends with inlet pipes 44, one for each tank, through which the fluid to be conveyed in the tank is introduced therein, and at their lower ends with outlet pipes 45, one for each tank, through which the contents of the tanks may be discharged, these inlet and outlet pipes preferably extending through the walls, hereinafter described, of the car, the portions 26 of the cradles preferably inclining downwardly toward the outlet pipes 45, as shown in Fig. 2 to insure the draining of all of the fluid from the tanks, it being understood that the pipes, referred to, for the tanks, would be provided with valves (not shown).

Referring now more particularly to the refrigerating feature of my improved tank car, the car is provided with a housing, superstructure, generally as in the case of refrigerator cars, this housing structure comprising the side walls 46 provided with doors 47 at the center of the car, end walls 48 and a roof 49. The floor portion of the car and the side and end walls thereof are so constructed as to insulate the interior of the car from the atmosphere, as for example by providing them of cellular form as shown, and which is common in ordinary refrigerator cars, the housing thus provided being formed of a false roof 50 shown likewise of cellular construction.

To prevent undue radiation at the portions of the cradles which oppose the spaces between the members 31, these spaces are preferably filled with alternating layers 51 and 52 of wood in the form of planks, and fibrous material, such as for example wool, this filling not only serving as an insulating medium but also serving to stiffen the anchorages.

In this connection, it may be stated that the flooring 36 is preferably built into the structure after the cradles have been anchored to the underframe, the floor being built closely around these anchorages and serving to aid in the stiffening of the latter.

Provision is made for refrigerating the contents of the car, both artificial and natural refrigeration being provided for, the former preferably for the purpose of initially cooling the parts of the car located within the walls of its superstructure, and also the contents of the tanks 24, and the latter for the purpose of maintaining the contents of the car in the desired cool condition. The natural refrigerating means in the construction shown involves the provision at the opposite ends of the car, of ice-bunkers 53 constructed, and provided for the circulation of cooling currents of air through the car, as ordinarily provided in refrigerator cars. The artificial refrigerating means shown comprises a series of coils 54 located directly beneath the false roof 50, one at each end of the car, the opposite ends of these coils extending downwardly through the bottom of the car and terminating in portions 55 and 56 at which these pipe coils are adapted to be interposed in any suitable refrigerating-medium circuit, as for example, one employing the use of cooled brine which in being forced through the coils 54, produce the desired refrigerating effect.

In the use of the car, as for example for transporting milk, the interior of the car, including the tanks 24, are preliminarily cooled to a temperature closely approximating the temperature at which the fluid afterwards introduced into the tanks 24, is to be maintained, by flowing the cooling medium through the coils 54. When the desired low temperature is reached, the fluid, as for example the milk, in then introduced into the tanks 24 and artificial refrigeration continued until the entire body of the milk is of the desired low temperature. As regards certain fluids, as for example milk, it is highly desirable that the lowering of the temperature of the fluid be effected simultaneously as to all portions thereof, and this is accomplished by providing for the continuous circulation of the contents of the tanks 24 during the subjection thereof to the cooling action produced by the refrigerating medium, these means, in the particular construction shown, involving a propeller device 55, one for each tank 24 which is located in one end of the tank, it being supported on a shaft 56 journalled in a wall of the tank and shown as driven through the medium of a motor 57.

Where the conditions are such that the temperature of the contents of the tanks 24 will not rise beyond the degree at which it is desired such contents be maintained, after the preliminary cooling referred to, and before the contents of the tanks are removed from the car, the preliminary refrigeration referred to will be sufficient. However, where the conditions are such that unless a continuing refrigerating action is produced in the car, the temperature of the contents of the tanks will rise beyond the desired degree, additional refrigeration should be provided. As an economical and simple way of producing the continuing refrigeration, provision is made for a natural refrigerating action, namely, by means of ice p led into the ice-bunkers, though it will be readily understood that where a continuing refrigeration is required the same may be provided for in any other desirable way.

While I have illustrated and described a particular construction embodying my invention, and shown and described a particular way of practicing my improved method, I do not wish to be understood as intending to limit it thereto, as the structure shown may be variously modified and altered and the method described practiced with considerable variations without departing from the spirit of my invention.

What I claim as new, and desire to secure by Letters Patent, is:

1. In a tank-car, the combination of a receptacle on the car, a tank extending into said receptacle, spacing means spacing said tank from said receptacle, and means anchoring said tank in said receptacle comprising a bed of cushioning adhering material in said receptacle and in which the lower portion of said tank is embedded.

2. In a tank-car, the combination of a tank, and a bed of material of such character as to be adapted to be introduced in fluid condition into said receptacle and form an embedment for the lower portion of said tank and become set in embedding position.

3. In a tank-car, the combination of a tank, and a bed of coal tar pitch in which the lower portion of said tank is embedded.

4. In a tank-car, the combination of a tank, a receptacle, hollow anchoring means engaging said receptacle and the underframe of the car, a bed of cushioning adhering material in said receptacle and in which the lower portion of the tank is embedded, and a filler in said anchorage, for the purpose set forth.

5. In a tank-car, the combination of a receptacle formed of a surrounding frame mounted on the car, a shell extending into said frame and having end walls which oppose the end members of said frame, and a tank confined in said receptacle.

6. In a tank-car, the combination of a tank, a bed of tacky cushioning material supported on the car and in which the lower portion of the tank is embedded and resisting lengthwise movement of the tank, and tank bands extending over the upper portion of the tank and secured at their lower ends to the car.

7. In a tank car, the combination of a tank, and a bed of tacky material in which the lower portion of said tank is embedded and to which said material is adhered.

8. In a tank car, the combination of a tank, and a bed of tacky cushioning material supported on the car and in which the lower portion of the tank is embedded, said tank being free to move longitudinally, except as restrained by said cushioning material.

9. In a tank car, the combination of a tank, and a bed of tacky cushioning material supported on the car and in which the lower portion of the tank is embedded, the portion of said bed contacted by said tank being adhered thereto.

10. In a tank car, the combination of a tank, and a bed of tacky cushioning material supported on the car and in which the lower portion of the tank is embedded, the portion of said bed contacted by said tank being adhered thereto and said tank being free to move longitudinally, except as restrained by said cushioning material.

11. In a tank car, the combination of a tank and a bed for said tank comprising cushioning material supported on the car and contacted by the lower portion of said tank, the portion of said bed contacted by the lower portion of said tank being adhered thereto.

12. In a tank car, the combination of a tank and a bed for said tank comprising tacky cushioning material supported on the car and contacted by the lower portion of said tank, the portion of said bed contacted by the lower portion of said tank being adhered thereto.

13. A tank car having a receptacle-forming portion, a tank, and a bed of cushioning material in said receptacle, and in which the lower portion of the tank is embedded and supported, the portion of said bed contacted by said tank being adhered thereto.

14. A tank car having a receptacle-forming portion, means anchoring said receptacle-forming portion in position on the car, a tank, and a bed of cushioning material in said receptacle and in which the lower portion of the tank is embedded and supported, the portion of said bed contacted by said tank being adhered thereto.

15. The method of anchoring a tank in a car, which consists in positioning the tank on the car and thereafter flowing a body of anchoring material of a character adapted to harden, into a position in which the lower portion of the tank is embedded therein.

16. In a tank car, the combination of an underframe comprising a center-sill structure, receptacle bearing means, a receptacle-forming cradle directly connected with said center-sill structure, and a tank supported in said cradle.

17. In a tank car, the combination of its underframe, a receptacle anchored thereon, a tank extending into said receptacle and spaced from the ends and the intermediate portion of said receptacle, and anchorage means for said tank comprising cushioning material composed of a mass of cohering non-separated particles interposed between the spaced-apart portions of said tank and receptacle.

18. In a tank car, the combination of its under-frame, a receptacle anchored thereon, a tank extending into said receptacle, spacing means interposed between the underside of said tank and said receptacle for spacing the tank from said receptacle, said tank also being spaced, at its ends, from said receptacle, and cushioning means interposed between the spaced-apart portions of said tank and receptacle.

19. The method of anchoring a tank car, which consists in positioning the tank on the car and thereafter flowing a body of anchoring material of a character adapted to harden, into a position in which it entirely embeds the lower portion of the tank.

20. The method of anchoring a tank on a car, which consists in flowing a body of anchoring material of a character adapted to harden into a position in which the lower portion of the tank is embedded therein.

21. In a tank-car, the combination of a tank, and a bed of pitch-like material in which the lower portion of said tank is embedded.

ROBERT R. WEAVER.